Patented Mar. 7, 1944

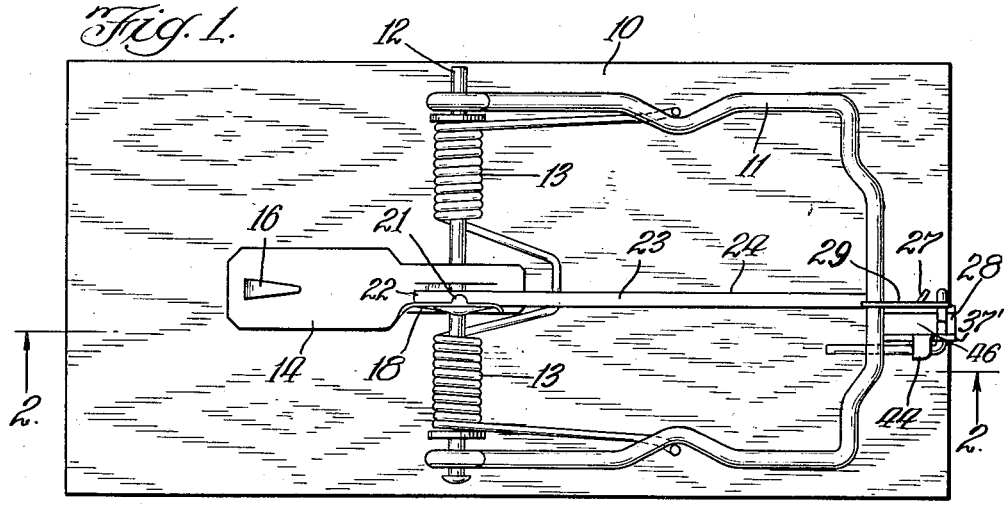

2,343,589

UNITED STATES PATENT OFFICE 2,343,589

ANIMAL TRAP AND SAFETY CATCH THEREFOR

Herbert A. Stilson, Chicago, Ill.

Application October 14, 1940, Serial No. 361,035

25 Claims. (Cl. 43—81.5)

This invention relates in general to animal traps and in particular to the safety mechanism employed on such traps to prevent their premature operation while being set.

In traps large enough to catch rats, or larger animals, the spring force on the jaw is generally sufficient to result in injury to the operator's fingers if the jaw is accidentally released during the setting operation. This danger is particularly objectionable in the usual rat trap which is set, by the operator constantly applying a manual pressure on the jaw in excess of the spring pressure until the jaw is held against release by the engagement of the jaw holding latch with the usual bait treadle. Attempts have been made to eliminate this danger by the use of automatically setting latches which are not touched by the operator during the setting of the trap. Traps having these type latches, however, are relatively costly and hence too expensive for the common demand for rat traps. Safety catches have also been employed but they have been more of an accessory to the trap rather than a unitary part of it, and besides being somewhat complicated and inefficient in operation served to unduly increase the overall cost of the trap.

The principal object of my invention, therefore, is to provide an improved animal trap.

Another object is to provide an improved safety mechanism which is simple and rugged in construction, efficient in operation, and formed as a part of the latching structure to in all provide an improved animal trap capable of being manufactured at a minimum of cost.

A further object is to provide an improved safety catch that is automatically operated to prevent the accidental release of the trap during the setting operation.

Yet another object is to provide an improved latch costruction in a trap of this character.

A feature of my invention is the provision of a safety catch which directly engages the latch to hold the spring jaw in a set position. The jaw is acted upon only by the latch so that the jaw and its associated spring are entirely free of any distortion such as may occur when a safety device acts on the jaw independently of the latch.

A further feature of my invention is the provision of a bait treadle which is pivoted on one side thereof directly to the same axis member used for pivotally supporting a spring pressed trap jaw.

Other objects, features and advantages of my invention will become apparent from the following description when taken in connection with the accompanying drawing in which:

Fig. 1 is a plan view of the complete trap assembly showing the jaw in its set position;

Fig. 2 is a fragmentary side elevation as seen along the line 2—2 of Fig. 1 showing the jaw of the trap just as it engages the hook of the latch;

Fig. 3 is a view illustrated similarly to Fig. 2 showing the camming action between the latch hook and the jaw;

Fig. 4 is also illustrated similarly to Fig. 2 and shows the jaw in an engaged position with the locking lever of the safety mechanism;

Fig. 4a is a sectional view of the latch as seen along line 4a—4a of Fig. 3;

Fig. 5 is a detail end elevation of the safety mechanism; and

Fig. 6 is a detail plan view showing a modification of the mechanism illustrated in Fig. 5.

In practicing my invention I provide an animal trap having a base with a spring actuated jaw pivotally supported thereon, and means including a pivoted latch for releasably retaining the jaw in a set or unsprung position. I further provide safety means having a pivoted catch which is automatically operated, on moving of the jaw to its set position, to directly engage and lock the latch in its jaw holding position until the catch is pivoted out of its locking position.

Referring to Fig. 1 of the drawing there is shown a trap with a base 10, having a jaw 11 pivoted on a pin 12 supported on the base and actuated by a pair of spring coils 13 mounted on the pin. The bait holding and jaw release mechanism includes an integrally constructed treadle 14 of substantially flat shape having a punched out bait prong 16 formed on its upper side near one end thereof. Near the opposite end of the treadle 14 and on the lower side thereof is an integral bearing portion 17 which is stamped out of the treadle in a manner to provide a securing strap for pivotally supporting the treadle on the pin 12 between the jaw actuating springs 13 (Figs. 1 and 2). It is thus seen that the treadle is freely movable both axially and rotatably on the pin 12. Adjacent one side of the bearing portion 17 is a projecting or upturned side portion 18 (Fig. 2) which is bulged outwardly as at 19 for a purpose to be explained. Substantially intermediate the ends of the projection or flange 18 is an overhanging lip or nib 21 which is operatively engageable with the end 22 of a pivoted latch 23. The latch 23 is comprised of a substantially flat body portion 25 integrally formed with an overhanging flange 24 extending substantially completely along the upper side thereof. As is clearly indicated in Figs. 2, 3, 4, and 4a, the flange 24 is bent substantially normal to the main body portion 25 of the latch 23 which is of varying width, the body portion at the latch end 22 engageable with the treadle 14 being relatively narrow so that the latch at this end has a substantially L-shaped section. The body portion 25 at the opposite end 26, however, is of sufficient body to provide for the pivotal supporting of the latch on a pin 27 which in turn is supported in a generally U-shaped bracket 28 mounted upon the base 10. With reference to Fig. 1 it is seen that the flange 24 stops short of the latch end 26, for a purpose to be later explained. By virtue of the substantially rounded corner portion on the latch 23 at the junction of the flange 24 and body portion 25 in engagement with the treadle 14, any possibility of a catching or binding of the latch on the lip 21 is entirely eliminated, so that a ready release of the jaw 11 occurs but for a very slight movement of the treadle in any direction. The bulge 19 in the portion 18 permits the latch to move under the lip a distance sufficient to assure a complete and positive engagement therewith. This construction of the treadle and latch thus serves to positively set the trap while permitting it to be sprung with but a minimum of movement of the treadle.

The latch 23 at the end 26 is integrally formed with an upwardly extending projection 29 of generally T-shape having a forward portion 31 releasably engageable with the spring jaw 11 and a rearward portion 32 engageable with a locking member or lever 33. Lever 33 (Fig. 5) is of irregular but substantially U-shape, the base portion 34 thereof being pivotally connected to the bracket 28 at recesses 36 formed in the bracket side portions 37 and 37' which are straddled by the leg members 38 and 39 of the lever 33. The side portions 37 and 37' are integrally formed with staple or anchoring portions 41 (Fig. 3) which penetrate the base 10 until the recesses 36 are adjacent the top of the base, the portions 41 being clinched on the under side of the base to firmly anchor the bracket 28 therein. Lever 33 is thus retained in the recesses 36 by the base 10. The end 42 of the lever leg member 38 is bent so as to extend inwardly over the bracket member 28 and forms a catch for engaging the rearward extension or portion 32 of the latch projection 29. Leg member 39 is bent forwardly of the leg member 38, the end portion 43 thereof being bent downwardly toward the base 10, for a purpose to be later explained. Pivotal movement of the lever 33 in a rearward direction, or to the right as viewed in Figs. 2, 3, and 4, is limited by a stop or ear 44 (Fig. 1) which is formed at the top of the side portion 37' and bent outwardly from the bracket member 28. The pivotal movement of the lever 33 forwardly is defined by the engagement of the end portion 42 with the latch extension 32. The lever is thus pivotally movable to two operating positions each of which positions is maintained by the frictional engagement of the lever base portion 34 with a flat spring 46 (Fig. 5) which is arranged between the bracket side portions 37 and 37' and inserted between the lever 33 and the base 10. As shown in Fig. 6, lever 33 may also be retained in its operated positions by constructing the ear portion 44 with a gradually widening section 47 so that a camming engagement occurs between the section and the lever leg 39. Since the lever 33 may be provided in wire, this engagement is sufficiently resilient to frictionally hold the lever in its operated positions. In order to provide a uniform bearing surface for the base portion 34 of the lever, a slotted ear 45 is cut from one, or from both sides 37 and 37' of the bracket and bent inwardly to the position shown in Fig. 6 as the bracket with the assembled members is driven into the base 10.

In the setting of the trap, the locking member 33 is initially moved to the position shown in Fig. 2 with the leg 39 in abutting engagement against the stop 44. Jaw 11 is then manually lifted from its sprung or closed position and moved downwardly as seen in Figs. 2, 3, and 4, in the direction of its set or open position. When the end of the jaw 11 engages the rounded top or cam portion 48 of the extension 31 the latch 23 is pivoted about the pin 27 and lifted to the position shown in Fig. 3. As the jaw passes this position the latch is free to fall pivotally downwardly, whereby the extension 31 is placed in a position to engage the jaw on a reversed movement thereof toward its sprung position. With the movement of the jaw continued downwardly, the end portion 43 of the leg 39 is engaged to pivotally move the catch 42 of the leg member 38 into engagement with the extension 32 of the latch 23, as shown in Fig. 4. Thus when the jaw 11 is released its movement toward its sprung position is stopped by engagement with the extension 31 of the latch 23. By virtue of the pivotal connection of both the latch and the lever 33 to the bracket 28, the latch, after such engagement, pivots slightly before being completely stopped by the safety catch 42 on the locking member 33. This slight pivotal movement of the latch 23 by the jaw 11 is sufficient to raise the forward end 22 of the latch slightly above the lip 21 and to maintain the latch under some amount of spring pressure. Thus when the latch is slipped by hand under the overhanging lip 21 on the bait treadle 14, this spring tension holds the treadle, latch and jaw in a set position. The safety catch 42 is then pivoted out of its locking position with the latch and the trap is free to be sprung on slight movement of the bait treadle 14 in any direction.

I have thus provided a trap which is positively locked against any accidental operation which might occur during the setting thereof, by the provision of an automatically operated safety catch which retains the jaw in its set position until the safety catch is manually actuated. Since this safety catch can be actuated after the complete trap is already placed in the position of its use, the usual dangers resulting from a premature operation of the trap are entirely eliminated. I provide also a safety locking means which is very simple in construction and which is formed as a unitary part of the jaw latching mechanism so as to reduce the overall expense of the trap to a minimum. The substantially flat construction of the body portion 25 of the latch 23 provides for the integral forming thereon of the projection 29 and the pivotal mounting of the latch directly to the mounting bracket or stationary support 28, which also forms a part of the safety locking means. This utilization of the latch mechanism as a part of the safety mechanism provides for the direct engagement of the jaw only by the latch 23. The jaw is thus entirely free of any other locking means so that there is no possible chance of the jaw becoming distorted during the setting operation regardless of the spring pressure which may be applied thereon through the latch 23.

It is to be understood that although my invention has been described and illustrated herein with reference to a preferred embodiment thereof that it is not to be so limited, since modifications and alterations therein can be made which are within the full intended scope of this invention as defined by the appended claims.

I claim:

1. An animal trap including a base, a spring actuated jaw, a latch pivoted at one end of the base and having an extension near the pivot point for latching said jaw, and a locking member mounted for pivotal movement adjacent the latch pivot, said latch having a second extension thereon releasably engageable with said locking member to hold said latch in a latched position.

2. In an animal trap including a base and a spring actuated jaw, the combination of a latch pivoted at one end to said base and having a pair of extensions formed thereon at said end, one of said extensions being movable into latching engagement with said jaw, a locking member pivotally mounted adjacent said one end for pivotal movement into and out of engagement with the other of said extensions to retain said latching engagement, and a pivoted bait treadle operatively engageable with the opposite end of said latch to hold the jaw in a latched position independently of said locking member.

3. An animal trap including a base and a spring actuated jaw, a pivoted base treadle, a pivoted latch for said jaw, said latch having a treadle engaging portion at one end and a locking portion engageable with said jaw at its opposite end, a support for said latch having a pair of side portions, one of said side portions pivotally supporting the latch at said opposite end, and the other of said side portions having a stop formed thereon, and a member for locking said latch while engaging said one latch end with said treadle to releasably hold said jaw in a set position, said member being pivotally mounted at said support and having a portion thereof engageable with said jaw on movement of the jaw to said set position and a locking portion movable into engagement with the locking portion of said latch on engagement of said actuating portion by said jaw, with movement of the locking portion on said member from its engaged position with said latch being limited by said actuating portion engaging said stop.

4. In an animal trap including a base and having a spring-pressed jaw and a pivoted latch for releasably holding said jaw in a set position, the combination of a stationary support for pivotally supporting said latch adjacent one end thereof, and a locking member pivoted on said stationary support, said latch having an extension formed thereon near said one end engageable with said locking member to prevent the release of said jaw.

5. In an animal trap including a base and having a spring-pressed jaw and a latch for releasably holding said jaw in a set position, the combination of a stationary support for pivotally supporting said latch adjacent one end thereof, and a locking lever pivoted on said stationary support, said latch having an extension formed thereon near said one end engageable with said locking member to limit the pivotal movement of said latch.

6. An animal trap including a base, a spring-pressed jaw, a pivotal latch for releasably holding said jaw in a set position, means mounted on said base for pivotally supporting said latch adjacent one end thereof, a locking member pivoted on said supporting means, said latch having an extending portion at said one end engageable with said member to prevent the release of said jaw, and means on said supporting means controlled by movement of the jaw for moving said locking member to its locking position.

7. An animal trap including a base and having a spring-pressed jaw, a latch pivoted at one end for releasably holding said jaw in a set position, means for pivotally supporting said latch at said one end, a locking member movably mounted adjacent the latch support, said latch having an extension engageable with said member to prevent the release of said jaw, and a bait treadle operatively engageable with the latch at the opposite end thereof to releasably hold said latch in locking position when said locking member is moved out of engagement with said latch.

8. An animal trap including a base, a spring-pressed jaw, a supporting member at one end of said base, a latch pivoted at one end on said member having a T-shaped extension adjacent said pivot, one side of the extension forming a catch for said jaw, and a locking lever pivotally mounted on said base engageable with the other side of said extension to prevent the release of said latch.

9. An animal trap including a base, a spring-pressed jaw, a support at one end of said base, a latch pivoted on said support at one end having a T-shaped extension adjacent said pivot, one side of the extension forming a catch for said jaw, and a locking lever pivoted on said support, said lever being engageable with the other side of said extension to prevent the release of said latch.

10. An animal trap including a base, a spring-pressed jaw, a support at one end of said base, a latch pivoted on said support at one end having a T-shaped extension adjacent said pivot, one side of the extension forming a catch for said jaw, a locking lever pivoted on said support, said lever being engageable with the other side of said extension to prevent the release of said latch, and a bait treadle operatively engageable with the latch at the other end to retain said jaw in a set position on release of said lever from its locking position.

11. An animal trap including a base, a spring-pressed jaw, a support at one end of said base, a latch pivoted on said support at one end having a T-shaped extension adjacent said pivot, one side of the extension forming a catch for said jaw, a locking lever pivoted on said support and engageable with the other side of said extension to retain said jaw in its latched position, and means controlled by movement of the jaw into setting position for pivotally moving said locking lever into engagement with said other side of the extension.

12. An animal trap including a base, a spring-pressed jaw, a support at one end of said base, a latch pivoted on said support at one end having a T-shaped extension adjacent said pivot, one side of the extension forming a catch for said jaw, and a locking lever pivoted on said support having a catch portion at one end engageable with the other side of said extension to retain said jaw in its latched position, said lever having an extension at its opposite end engageable with said jaw when it is moved to setting position to bring said catch portion in engaging position with said one side of the extension to limit the pivotal movement of said latch.

13. An animal trap including a base and having a pivoted bait treadle, a spring-pressed jaw, means for releasably retaining said jaw in set position including a latch pivoted at one end and operatively engageable with said bait treadle at the other end, means for pivotally supporting said latch, and locking means pivotally mounted at the latch support having a catch portion engaging said latch in response to movement of said jaw into its set position, and retaining said latch in set position against release until the catch portion is pivoted out of locking position.

14. An animal trap including a base, a spring-pressed jaw, a supporting member at one end of said base, a latch pivoted on said member at one end having a T-shaped extension adjacent said pivot, one side of the extension forming a catch for said jaw, and a locking lever pivoted on said member operatively engageable with the other side of said extension to hold the jaw in its latched position, said supporting member having anchoring portions penetrating said base for mounting the member thereon.

15. In an animal trap including a base and having a spring-actuated jaw and a pivoted bait treadle, the combination of a latch for said jaw having a substantially flat body portion of enlarged section at one end integrally formed with a laterally bent flange portion extending along one side thereof from its other end substantially to said enlarged end section, with said treadle having a holding portion thereon engageable at said other end with said flange portion to releasably hold the latch in a set position, a latch supporting member pivotally supporting the latch at said enlarged portion, said enlarged portion being of substantially T-shape with one side thereof forming a catch for said jaw, and a locking lever pivoted on said supporting member, with said lever being engageable with the other side of said enlarged portion to prevent the release of said latch during the setting of said treadle holding portion in engagement with said flanged side.

16. In an animal trap having a base and a spring actuated jaw with pivot means mounted on said base for pivotally supporting said jaw, the combination of means for holding said jaw in a set position including a latch having an end portion with a cross section of substantially L-shape, supporting means on said base for pivotally supporting said latch adjacent the other end, locking means pivoted on said supporting means for pivotal movement into and out of engagement with said latch when the latter is in set position, and a bait treadle pivotally supported on said pivot means, said treadle being operatively engageable with said one end of the latch to releasably retain said jaw in set position when the locking means is pivoted out of locking position.

17. In an animal trap including a base and having a pivoted bait treadle and a spring-pressed jaw, the combination of a latch having a body portion of substantially flat form, a stationary support for pivotally supporting said latch adjacent one end thereof, said latch having extending portions formed thereon near said one end, one of said portions being pivotally movable into latching engagement with said jaw, a locking member pivoted on said support for pivotal movement into and out of locking engagement with a second one of said extending portions when said first portion is in a latch engaging position, said pivoted bait treadle being operatively engageable with the other end of said latch to releasably retain said jaw in a set position on disengagement of said locking member from said second portion.

18. An animal trap including a base and having a pivoted bait treadle, a spring-pressed jaw, means for releasably retaining said jaw in set position including a pivoted latch operatively engageable at one end with said bait treadle, a stationary support for pivotally supporting the latch at its other end, said latch at said other end having an upwardly extending substantially T-shaped projection, one side of said projection being movable into latching engagement with said jaw and having a cam portion on the top side thereof, a locking lever pivoted on said stationary support having one end slidably engageable with said jaw and its opposite end pivotally movable into and out of locking engagement with the other side of said projection, said jaw on movement to its set position slidably engaging said cam portion and pivotally raising said latch to move said one projection side into a latching position, and later engaging said one lever end to pivotally move said opposite lever end into locking engagement with the other projection side, said lever retaining the latch in set position against release until pivoted out of said locking engagement.

19. In an animal trap having a spring-pressed jaw, means releasably holding said jaw in a set position including a pivoted latch, a stationary support for pivotally supporting said latch adjacent one end thereof, and locking means acting on said latch adjacent said one end to hold said jaw in a set position, said locking means being movably retained by said support and holding said jaw against release until moved out of engagement with said latch.

20. An animal trap including a base and having a pivoted bait treadle, a spring-pressed jaw, means for releasably retaining said jaw in a set position including a latch, means pivotally supporting said latch at one end, with the other end thereof being operatively engageable with said bait treadle, and locking means movably mounted at said latch support having an extending portion engageable with said latch when the jaw is in a set position, and retaining said jaw in set position against release until said extending portion is moved out of said engaging position with said latch.

21. An animal trap including a base, a spring-pressed jaw, a pivoted bait treadle, means pivotally supporting said latch at one end on said base, with said latch at the opposite end thereof being operatively engageable with said bait treadle, said latch having a pair of projecting portions at said one end, with one of said projections forming a catch for releasably engaging said jaw, and locking means movably mounted at said latch support having a projecting portion engageable with the other of said latch projections when the jaw is in a set position, and retaining said jaw in set position against release until said projecting portion is moved out of engagement with said latch.

22. An animal trap having a base and a pivoted bait treadle, a spring-pressed jaw, a supporting member at one end of said base, a latch having an end portion pivotally supported on said supporting member, with the other end portion thereof being operatively engageable with said bait treadle, said one end portion having a pair of projections thereon, one of said projections forming a catch for said jaw to releasably hold the same in a set position, and locking means movably mounted at said supporting member having an extending portion at one end engageable with the second projection on said latch to hold said jaw in a set position against release, said locking means having an opposite end portion engageable with said jaw when it is moved to a setting position to move said extending portion to said jaw holding position, said extending portion retaining the jaw against release until moved out of engagement with said latch.

23. An animal trap including a base, a spring-actuated jaw, a movable bait support, a movable latch adapted to coact with said bait support to hold said jaw in a set position, and means actuated into engagement with said latch in response to movement of said jaw into its set position for holding said latch in a position such that said jaw is held in its set position independently of said bait support.

24. An animal trap including a base and a spring-actuated jaw, a latch having a jaw latching portion, and a locking member adapted to be acted upon by said jaw and moved into locking position with said latch when said jaw latching portion is in a position to latch the jaw.

25. An animal trap including a base, a spring-actuated jaw, a latch pivotally connected at one end to said base having a portion for latching said jaw in set position, and means movably supported on said base having an actuating portion and a locking portion, said jaw on being moved to a set position successively acting on said latch portion to move the same into a jaw latching position, and on said actuating portion to move said locking portion into locking position with said latch.

HERBERT A. STILSON.